United States Patent [19]

Cook et al.

[11] Patent Number: 4,707,373

[45] Date of Patent: Nov. 17, 1987

[54] EDIBLE COMPOSITIONS COLORED WITH (2-ALKOXY-4-SULFONYL-5-ALKYPHENYL-)AZO-1-HYDROXYNAPHTHALENE SULFONIC ACIDS

[75] Inventors: Wayne L. Cook, Cincinnati; Robert P. Huth, Milford, both of Ohio

[73] Assignee: Hilton Davis Co., Cincinnati, Ohio

[21] Appl. No.: 887,308

[22] Filed: Jul. 18, 1986

Related U.S. Application Data

[62] Division of Ser. No. 617,451, Jun. 5, 1984.

[51] Int. Cl.$^4$ ............................................. A23L 1/275
[52] U.S. Cl. ................................... 426/540; 426/260
[58] Field of Search .............................. 426/250, 540

[56] References Cited

U.S. PATENT DOCUMENTS

| | | | |
|---|---|---|---|
| 3,519,617 | 7/1970 | Rast et al. | 534/883 |
| 3,578,652 | 5/1971 | Rast et al. | 534/887 |
| 3,640,733 | 2/1972 | Rast et al. | 426/615 |

OTHER PUBLICATIONS

Colour Index 14700.
Colour Index 16185.

*Primary Examiner*—Jeanette Hunter
*Attorney, Agent, or Firm*—Terrence E. Miesle

[57] ABSTRACT

Salts of phenylazonaphthyl sulfonic acids useful as blue-red colorants for textile fabrics, cellulosic fibers and edible compositions are prepared by diazotizing aniline sulfonic acid and coupling the resulting diazo compound to a 1-hydroxynaphthalene mono- or disulfonic acid.

7 Claims, No Drawings

EDIBLE COMPOSITIONS COLORED WITH (2-ALKOXY-4-SULFONYL-5-ALKYPHENYL)AZO-1-HYDROXYNAPHTHALENE SULFONIC ACIDS

This application is a division of application Ser. No. 617,451, filed June 5, 1984.

BACKGROUND OF THE INVENTION (a) Field of the Invention

The invention described herein relates to the field of chemistry and more particularly, to novel monoazo compounds useful in coloring edible compositions, in coloring textile fibers and in coloring cellulose; to processes for preparing said azo compounds and to the use thereof coloring edible compositions, coloring textile fibers and coloring cellulose.

(b) Information Disclosure Statement

There is a group of colorants which are approved by the U.S. Food and Drug Administration for incorporating into edible foodstuffs in the United States. Among the currently listed colorants are two red colorants, FD&C Red No. 3, which is a dyestuff of the xanthene class, and FD&C Red No. 40, which is a monoazo dyestuff. There are two additional azo dyestuffs, FD&C Red No. 2 and FD&C Red No. 4, which at one time had been approved as colors for edible compositions but over the years were removed from the list of approved colors. With the removal of FD&C Red No. 2, there was left a void in the colorants available for edible compositions for a single component blue-red colorant for edible uses and, in particular, a blue-red colorant which had stability in acidic compositions. The two remaining approved red colorants each have deficiencies which make them unacceptable for solving this problem. The colorant FD&C Red No. 3 is a blue-red, but has very poor stability in acidic compositions which have a pH lower than 4.2 and, depending upon the composition and its pH, will, over varying periods of time, turn colorless. FD&C Red No. 40 is a yellow-red and, even at high concentrations, will not impart a blue hue to compositions containing the colorant.

U.S. Pats. Nos. 3,519,617 and 3,640,733, which issued July 7, 1970 and Feb. 8, 1972, respectively, disclose yellow-red monoazo dyestuffs including FD&C Red No. 40 having the formula

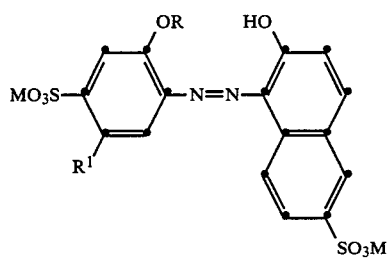

wherein R and $R^1$ each represents lower alkyl of from 1 to 6 carbon atoms and M is hydrogen, ammonium or a physiologically acceptable metal cation, such as sodium, potassium, barium, calcium or iron. The azo dyestuffs are prepared by diazotizing the appropriate amine and coupling it to 2-hydroxynaphthalene-6-sulfonic acid and are disclosed as being useful to color edible composition.

Colour Index discloses as C.I. 14700 the yellow-red monoazo dyestuff having the formula

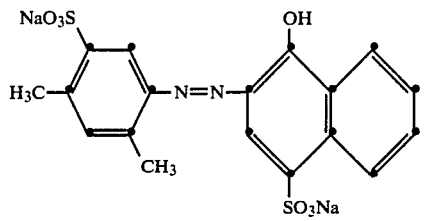

which at one time was approved as FD&C Red No. 4 and used to color cherries. The monoazo dyestuff is prepared by diazotizing 3-amino-4,6-xylenesulfonic acid and coupling the diazo compound to 1-hydroxynaphthalene-4-sulfonic acid.

U.S. Pat. No. 3,578,652, which issued May 11, 1971, discloses a series of monoazo dyestuffs having the formula

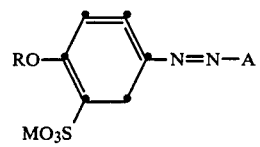

wherein R is an alkyl group of 1 to 6 carbon atoms, M is a hydrogen, ammonium or a physiologically acceptable metal cation, such as sodium, potassium, barium, calcium or iron and A is a monovalent radical selected from the group consisting of

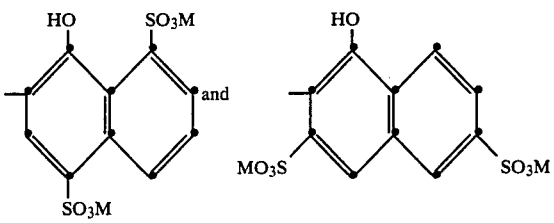

wherein M has the same definition as above. The azo dyestuffs are prepared by diazotizing the appropriate amine and coupling it to the desired naphtholdisulfonic acid. The dyestuffs are disclosed as being useful as colorants for foods, pharmaceuticals, cosmetics, and the like, and the aluminum lakes of the dyestuffs as pigments for plastics.

Colour Index discloses as C.I. 16185 the blue-red monoazo dyestuff having the formula

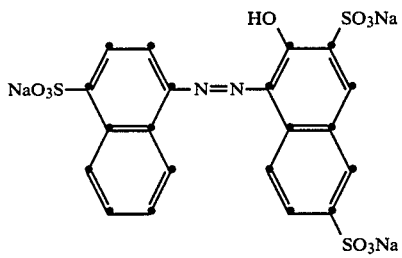

which is also known as Amaranth and was formerly approved as FD&C Red No. 2 for use in edible compositions. The monoazo dyestuff is prepared by diazotizing 1-aminonaphthalene-4-sulfonic acid and coupling the resulting disazo compound to 2-hydroxynaphthalene-3,6-disulfonic acid.

SUMMARY OF THE INVENTION

In its composition of matter aspect, the invention relates to certain water-soluble monoazo compounds of the formula

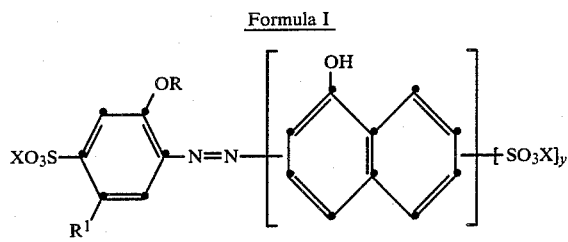

Formula I useful in coloring textile fabrics and edible compositions.

In its process aspect, the invention relates to a process for preparing the water-soluble monoazo compounds of Formula I which comprises diazotizing an appropriate 1-RO-3-SO$_3$H-4-R$^1$ aniline; and coupling the resulting diazonium salt with the appropriate 1-hydroxynaphthalene mono- or disulfonic acid.

The present invention provides, in one of its methods of use aspects, a method of coloring textile fibers which comprises applying to said textile fibers a monoazo compound of Formula I.

The present invention provides, in a second of its methods of use aspects, a method of coloring edible compositions which comprises incorporating into said edible compositions a monoazo compound of Formula I.

The present invention provides, in one of its methods of use aspects, a method of coloring cellulose fibers which comprises treating said cellulose fibers with a monoazo compound of Formula I.

DETAILED DESCRIPTION INCLUSIVE OF THE PREFERRED EMBODIMENTS

More specifically, this invention, in its composition of matter aspect, resides in the novel water-soluble monoazo compounds, which are particularly useful as blue-red colorants for textiles, cellulose fibers and edible compositions and which have the structural formula

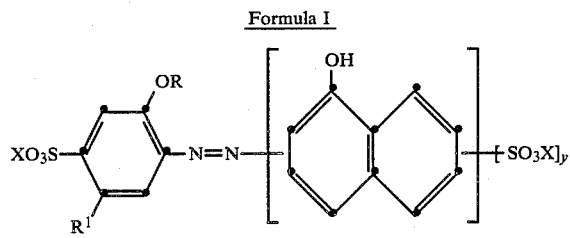

Formula I wherein R and R$^1$ independently represent non-tertiary C$_1$ to C$_4$ alkyl; X represents hydrogen or any physiologically acceptable cation; and y represents 1 or 2.

In a particular embodiment in accordance with its composition of matter aspect, the invention sought to be patented resides in the water-soluble monoazo compounds according to Formula I wherein y is 1.

Particularly preferred within this embodiment are the water-soluble monoazo compounds having the structural formulas

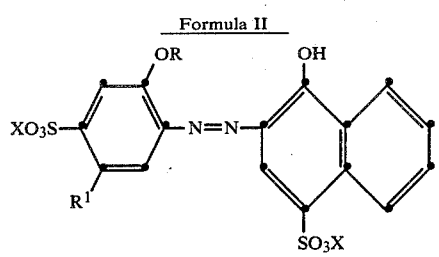

Formula II

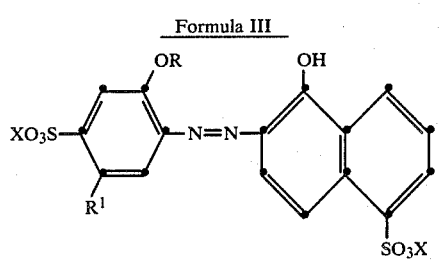

Formula III

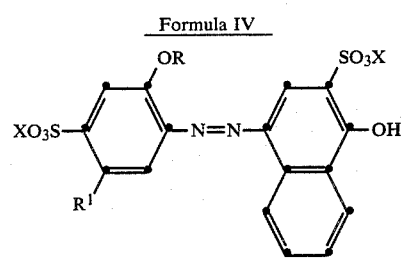

Formula IV in which R, R$^1$ and X have the same respective meanings given in Formula I.

In a second particular embodiment within its composition of matter aspect, the invention sought to be patented resides in the water-soluble monoazo compounds according to Formula I wherein y is 2.

Particularly preferred within this second embodiment are the water-soluble compounds having the structural formula

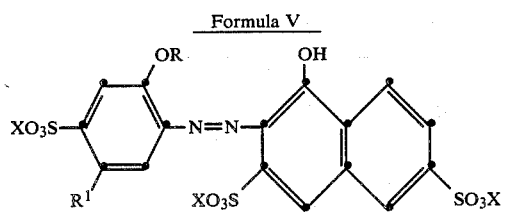

Formula V in which R, R$^1$ and X have the same respective meanings given in Formula I.

In its process aspect, the invention sought to be patented resides in the process for the preparation of the monoazo compounds according to Formula I which comprises diazotizing an amine of the formula Formula VI

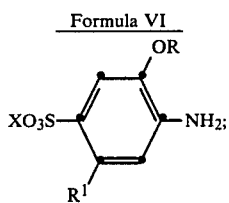

coupling the diazonium salt with approximately one molecular equivalent of a coupling component of the formula Formula VII

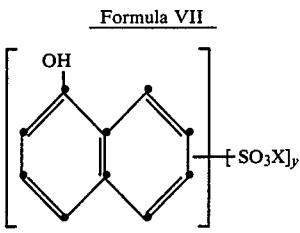

wherein R, $R^1$, X and y have the same respective meanings given in Formula I.

In one of its method of use aspects, the invention sought to be patented resides in a method of dyeing textile fibers a blue-red color which comprises applying to said fibers a monoazo compound according to Formula I.

In a second of its method of use aspects, the invention sought to be patented resides in a method of coloring edible compositions a blue-red color which comprises incorporating into said edible composition a monoazo compound according to Formula I.

In a third of its method of use aspects, the invention sought to be patented resides in a method of coloring cellulose fibers a blue-red color which comprises applying to cellulose fibers a monoazo compound according to Formula I.

As used herein the term "non-tertiary $C_1$ to $C_4$ alkyl" denotes saturated monovalent straight or branched-chain aliphatic hydrocarbon radicals including methyl, ethyl, propyl, isopropyl, butyl, secondary butyl and isobutyl.

As used herein the term "physiologically acceptable cation" denotes the ammonium cation or any metal cation which is acceptable in edible compositions or in contact with human skin and includes sodium, potassium, barium, calcium, iron and the like.

The water-soluble monoazo compounds of Formula I are dyestuffs which impart a blue-red color to the items dyed. They are useful for coloring natural fibers and synthetic fiber-forming materials, such as threads, fibers, textile fabrics and the like. The water-soluble monoazo compounds are useful for coloring and printing textile materials made from natural fibers, such as wool, cotton, and silk, those made from semi-synthetic fibers, such as regenerated cellulose as represented by viscose or those made from synthetic fibers, such as polyaddition, polycondensation or polymerization compounds as represented by nylon and acrilan. Such colorings or printings can be carried out with the subject monoazo compounds in accordance with the usual dyeing and printing processes.

The monoazo compounds of Formula I are also suitable for surface coloring or printing on sized cellulose fiber paper products and cardboard, as well as for coloring paper pulps using procedures well known in the art for coloring sized paper.

They are also useful for coloring edible compositions, such as foodstuffs and food containers. Thus, they can be incorporated into the edible material as a finely divided powder in a dry blending operation; as a finely divided powder into a liquid to form a color concentrate solution; or, if desired, they can be reconstituted as an aqueous solution which may then be used to impart color to an edible material. A typical example of a dry blending application is the incorporation of the monoazo compounds of Formula I into uncolored gelatin dessert mix base as the coloring agent. The resulting colored mix, when prepared in the normal manner, produces a clear, colored gelatin dessert. In another example of utility, the finely divided monoazo compounds may be dissolved in simple syrup solutions to prepare colored concentrates for use in the manufacture of carbonated beverages. In still another example of utility in edible compositions, the monoazo compounds may be dissolved in a liquid, for example, water and then the colored solution added to the edible material as the coloring agent.

The monoazo compounds of the instant invention are characterized by a high degree of stability to natural acids found in foodstuffs and to acids commonly used by the food industry in the preparation of such edible materials as fruit flavored gelatin desserts, carbonated fruit flavored soft drinks and non-carbonated fruit flavored beverages. The dyestuffs are soluble in water and are stable in aqueous solutions having a pH of 4.2 or lower. They are stable to ascorbic acid in concentrations ranging from 1 to 300 parts per million. Further, they are stable at temperatures encountered in baking and cooking operations. When used to color soft dringks, both carbonated and non-carbonated, the dyestuffs are essentially non-corrosive to the beverage containers. The novel monoazo compounds of this invention also possess excellent light stability in a variety of substrates.

These characteristics of the novel monoazo compounds are indicative of their suitability as colorants for edible compositions, for example, fruits, sugar confections, hard candies, gelatin desserts, beverages, and cake and candy mixes. Furthermore, these compounds are useful in the coloring or printing of food containers, wrappers, labels and so forth, which may come in contact wiht edible compositions.

Moreover, the novel monoazo compounds of this invention provide a solution to a long sought after need for a blue-red-colored dyestuff useful in coloring foodstuffs and food containers which was created when the U.S. Food and Drug Administration removed FD&C Red No. 2 from its approved list of food colors.

The best mode contemplated by the inventors of carrying out this invention will now be described so as to enable any person skilled in the art to which it pertains to make and use the same.

The novel, water-soluble monoazo compounds of Formula I are conveniently obtained in accordance with the process aspect of this invention. In general, the novel monoazo compounds of this invention are prepared by coupling the appropriate diazotized aniline with the appropriate alpha-hydroxynaphthalene mono- or disulfonic acid. By way of illustration, an aniline sulfonic acid of Formula VI and sodium nitrite are dissolved in dilute sodium hydroxide solution and slowly added to a mixture of concentrated hydrochloric acid and ice keeping the temperature under 10° C. by adding additional ice to obtain a solution of the corresponding diazonium salt. In a second container, the coupling component, for example, a hydroxynaphthalene sulfonic acid of Formula VII is slurried in an aqueous solution of sodium carbonate. The coupling slurry is then cooled to approximately 0° C. with the addition of ice and the diazonium salt solution is added gradually, maintaining the temperature under 20° C. by adding ice. This reaction mixture is then stirred to complete the coupling and develop the color. The resulting solution is heated to a temperature in the range of 40° to 60° C. and clarified by treating with activated charcoal and distomateous earth and filtering. The monoazo compound thus obtained may be isolated in convention methods, such as crystallization, evaporation and so forth or it may be utilized as an aqueous solution. For example, the monoazo compound may be isolated by cooling the resulting solution to room temperature and after adjusting the volume of the solution, sodium chloride is added gradually causing the monoazo compound to crystallize out of solution. The solid is isolated by filtration and washed with 18° Be' and 12° Be' aqueous sodium chloride solution and with aqueous ethyl alcohol prior to drying.

The requisite diazotizable anilines are known as a class in the art and are commercially available or can be readily obtained by procedures well known in the prior art.

The requisite 1-hydroxynaphthalene mono- and disulfonic acids useful as coupling components are well known as a class in the art and are commercially available or can be readily obtained by procedures well known in the prior art.

The invention is illustrated by the following examples without, however, being limited thereto.

EXAMPLE 1

A. A solution of 200.0 ml of water, 30.0 g of 70 percent para-cresidine sulfonic acid, 9.0 g of 50 percent sodium hydroxide and 7.5 g of sodium nitrite was added slowly to a mixture of 25.0 ml of concentrated hydrochloric acid and ice while maintaining a temperature in the range of 0° to 10° C. with the gradual addition of ice. The resulting mixture was stirred approximately thirty minutes at a temperature in the range of 8° to 10° C., maintaining a slight excess of nitrite ion (positive test with starch/iodide paper) and maintaining acid conditions (blue to Congo Red test paper).

B. In a second reaction vessel, 26.0 g of sodium 1-hydroxy-4-naphthalene sulfonate was added gradually to a solution of 21.0 g of sodium carbonate dissolved in 200.0 ml of water. The resulting slurry was cooled to 0° to 10° C. by the addition of ice.

C. The diazotized solution from Part A above was added slowly over approximately fifteen minutes to the slurry from Part B, maintaining a temperature under 20° C. by adding ice as needed. After the addition was complete, the resulting solution was stirred approximately thirty minutes at 20° to 25° C. at which time the test for excess diazo compound against alkaline H-acid (8-amino-1-naphthol-3,6-disulfonic acid) was negative. The solution was treated with 2.5 g of activated charcoal and 2.5 g of diatomateous earth at approximately 50° C. for about thrity minutes, filtered and the filter cake washed with hot water. After cooling to room temperature, 150.0 g of sodium chloride was added to the clarified filtrate which had been adjusted to a volume of one liter. The crystalline solid which separated was collected by filtration and the solid was washed on the filter sequentially with 300.0 ml each of 18° Be' and 12° Be' aqueous sodium chloride solution at 20° C. and 300.0 ml of 30 percent aqueous ethyl alcohol. The filter cake was dried in vacuo at approximately 90° C. to obtain 39.0 g of red-brown-colored solid which contained 33.9 g of the diazo compound having the structural formula

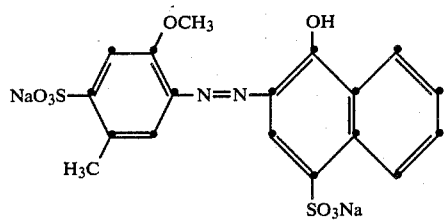

EXAMPLE 2

Proceeding in a manner similar to that described above, 60.0 g of 70 percent para-cresidine sulfonic acid was diazotized and coupled to 50.0 g of sodium salt of 1-hydroxynaphthalene-5-sulfonic acid to obtain 117.0 g of a red-brown-colored powder which contained 99.5 g of the azo compound having the formula

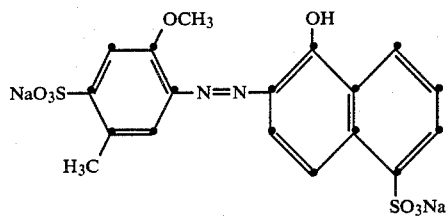

7.8 g of volatile material, 7.08 g of sodium chloride and 1.2 g of sodium sulfate.

EXAMPLE 3

Following a procedure similar to the one described in Example 1 above, 121.0 g of water-wet filter cake containing 43.5 g of para-cresidine sulfonic acid was diazotized and coupled to 71.5 g of disodium 1-hydroxynaphthalene-3,6-disulfonate to obtain 136.0 g of a green-brown-colored powder which contained 123.0 g of the diazo compound having the structural formula

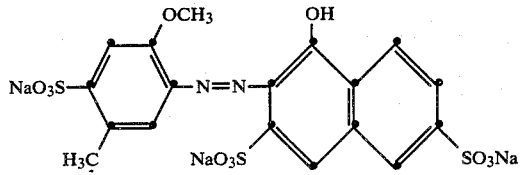

EXAMPLE 4

In a manner similar to that described in Example 1 above, 24.2 g of water-wet filter cake containing 8.7 g of para-cresidine sulfonic acid was diazotized and coupled to 15.6 g of (64.1 percent) sodium salt of 1-hydroxynaphthalene-2-sulfonic acid to obtain 20.0 g of a greenbrown-colored powder containing 18.5 g of the diazo compound having the structural formula

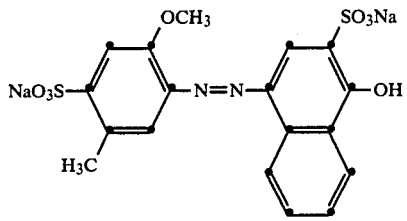

EXAMPLE 5

A solution was prepared by dissolving 52.0 mg of the monoazo compound of Example 1 (86.9 percent pure color) in 100.0 ml of room temperature tap water. Into this solution, which had a pH of approximately 7.0, a 5.0 g (5 inch by 4 inch) piece of multifiber test cloth was submerged. The cloth contained the following fibers: Cellulose Acetate, Acrilan 1650, Arnel, Cotton, Creslan 62, Dacron 54, Dacron 64, Nylon 66, Orlon 75, Silk, Verel A, Viscose and Wool. The solution and cloth was heated to a gentle boil, maintained at the boil for approximately thirty minutes at which time the cloth was removed from the solution and rinsed under cold tap water until no color was observed visually in the rinse water. After drying, the cloth was rated visually for the amount of dye which remained on each of the types of fibers. The ratings for the amount of dye retained on the fibers was as follows: None<poor<fair<good<very good<excellent. 1650, cotton and viscose had a fair rating; silk had a good rating; and nylon 66 and wool had an excellent rating. Silk, nylon 66 and wool all exhibited a deep blue-red color after dyeing.

EXAMPLE 6

Proceeding in a manner similar to that described in Example 5 above, 58.5 mg of the monoazo compound (85.0 percent pure color) obtained in Example 2 above was dissolved in 100.0 ml of tap water and the resulting solution was used to dye 5.0 g of multifiber cloth. The results were: acrilan 1650, cotton and viscose rated fair; silk rated good; and nylon 66 and wool rated excellent. The silk, nylon 66 and wool fibers had a deep blue-red color.

EXAMPLE 7

Following a procedure similar to the one described in Example 5 above, 49.8 mg of the monoazo compound (90.5 percent pure color) of Example 3 was dissolved in 100.0 ml of tap water and used to dye 5.0 g of multifiber cloth. 1650 and cotton both had a poor to fair rating; viscose had a poor rating; silk had a fair rating; nylon 66 had a very good to excellent rating; and wool had an excellent rating. Nylon 66 and wool fibers had a deep blue-red color.

EXAMPLE 8

A 0.1 percent stock dye solution was prepared by dissolving 1.0 g of the product from Example 1 above in distilled water and diluting to a volume of one liter with distilled water. With stirring, 6.0 ml of the 0.1 percent dye solution was added to 100.0 g of an aqueous slurry containing approximately 3 grams of bleached kraft pulp (600 Canadian Standard Freeness). Agitation was continued for approximately fifteen minutes and 5.0 ml of a 1.7 percent aqueous solution of 70 percent active pale rosin size was added. After five minutes, 5.0 ml of a 1.5 percent aqueous solution of papermaker's iron free alum was added and agitation was continued for approximately ten minutes. With agitation, the resulting slurry was diluted to a volume of approximately four liters with the addition of water. The dyed pulp was formed into an 8 by 8 inch square of paper on a Novel and Wood sheet mold. The paper sheet was pressed between two blotters and then dried at 180° F. for four minutes between two fresh blotters to yield a uniformly dyed blue-red-colored paper sheet.

TESTING PROCEDURES

The following test procedures were employed to determine the resistance of the dyestuffs to bleed in moist paper and to bleaching with hypochlorite bleach.

WATER BLEED TEST

This procedure is a modification of the AATCC Standard Test Method 15-1962, "Colorfastness to Perspiration."

Test pieces consisting of four plies, each one inch square, are cut from the dyed paper to be tested. One or more dyed papers of known dye migration are included in the test series as standards.

The absorbent material consists of filter paper having a relatively smooth finish (Whatman #1, 4.25 cm. dia. equivalent). In addition, smooth, flat, glass or clear plastic plates of adequate stiffness, measuring two inches wide and three inches long, are required as separating plates. A 1,000 gram weight serves as a dead weight loading.

Four filter paper absorbent pieces are used for each dyed test square, two for each side.

The migration test "sandwich" is constructed as follows. A separating plate is placed centrally on a horizontal support and two pieces of the filter paper placed centrally on this plate with the smoother side up. The square dyed test pieces, held with tweezers, are immersed in tap water at room temperature for five seconds, drained for five seconds, and immediately centered on the filter paper. Immediately, two pieces of filter paper are centered on the test square and followed at once by another separating plate. This "sandwich" is pressed for a moment with the fingers, after which, without delay, two pieces of filter paper are positioned on the top of the separating plate as before to receive a second test square of wetted dyed paper. The above procedure is then repeated as rapidly as possible and without interruption, stacking one "sandwich" on the other, until all dyed paper test pieces have been put under test.

As soon as a stack is completed, a 1,000 gram weight is centered on the top separating plate. The stack is allowed to stand at room temperature (75° F.) for fifteen minutes.

At the end of the migration period, the stack is disassembled and each dyed paper test square and its filter paper absorbants clipped to a supporting card. A separate card is used for each test square. The dyed paper test squares and filter papers are air dried at room temperature for at least two hours (in the dark) before ranking. Relative degrees of dye migration, as compared to that from standard samples, are determined by visual ratings, in daylight, of the intensity of dye stain on the filter paper surfaces which had been in contact with the test square. The evaluations are graded on the basis of the following scale:

| BLEED GRADE | DEFINITION |
| --- | --- |
| None | No observable bleed |
| Trace | First noticeable bleed |
| Slight | Approximately twice the trace amount of dye bleed |
| Moderate | Approximately four times the trace amount of dye bleed |
| Appreciable | Approximately eight times the trace amount of dye bleed |
| Much | Approximately sixteen times the trace amount of dye bleed |
| Very Much | Approximately thirty-two times trace amount of dye bleed |

BLEACH TEST

This procedure compares the degree to which the color of dyed papers would be discharged in a waste paper recovery operation employing hypochlorite bleach.

A preliminary estimate of bleachability is obtained by placing a drop of hypochlorite bleach, containing 2.5 percent available chlorine, on the dyed paper and allowing it to dry at room temperature. From this test, both rate and degree of bleachability are estimated.

A more accurate test, approximating paper mill procedure, is performed by defibering three grams of dyed paper in 150.0 ml of distilled water using a kitchen blender. The defibered pulp slurry is placed in a jar and hypochlorite is added to the extent desired, usually 2.5 percent available chloride based on the weight of the dry fiber. The slurry, consisting of pulp and hypochlorite, is adjusted to pH 9 with dilute sulfuric acid or dilute aqueous solution of sodium hydroxide and placed in a water bath to maintain the interval in the temperature range of 115° to 125° F. After the test is started, the jar is loosely capped. At five minute intervals, the cap is tightened and the jar inverted twice to circulate the liquor. The cap is loosened between inversions. After twenty minutes, the pH is checked, and if higher than 7.5, is adjusted thereto. The test is then continued for an additional twenty minutes (with five minutes beteen inversions). The terminal pH is generally found to be 6.0–6.5. An excess of sodium thiosulfate is added as an antichlor, mixed for five minutes and the slurry is diluted to a concentration of approximately 0.3 percent of fiber. Sheets are then prepared at pH 7 without a washing step. Finally, this sheet is pressed and dried in a paper dryer. Control dyeings at specific levels can then be made to accurately determine the loss of strength of color on bleaching.

Paper dyed with aqueous dilutions of the monoazo compound prepared in Example 1 above was found to be highly bleachable and the color was found to bleed slightly from the paper in the water bleed test.

EXAMPLE 9

Proceeding in a manner similar to that described in Example 8 above, each of the monoazo compounds from Examples 2, 3 and 4 were used individually to dye paper sheets and the resulting paper sheets were tested for their bleachability and bleed in the water bleed test. The results are as follows:

| MONOAZO COMPOUND | COLOR OF PAPER SHEET | BLEACH TEST | WATER BLEED |
| --- | --- | --- | --- |
| Example 2 | Blue-red | Very Good | Slight |
| Example 3 | Blue-red | Very Good | Slight to Moderate |
| Example 4 | Blue-red | Very Good | Slight |

EXAMPLE 10

A. With stirring, 12.0 g of granulated cane sugar, 1.0 g of citric acid, 0.40 ml of benzaldehyde and 5.0 mg of the red azo compound from Example 1 above was dissolved in 250 ml of club soda to obtain a blue-red cherry flavored carbonated beverage which visually appeared similar to a commercial product.

B. Following the procedure described in Part A directly above, a cherry flavored carbonated beverage was prepared substituting 5.0 mg of FD&C Red No. 40 for the red azo compound of Example 1. The product was a yellow-red solution and was less similar in color to the commercial product.

C. Proceeding in a manner similar to the one described in Part A directly above, a cherry flavored carbonated beverage was prepared substituting 65.0 mg of aspartame for 12.0 g of granulated cane sugar. The product was a blue-red-colored liquid which visually was similar to a commercial cherry beverage.

D. In a manner similar to the procedure described in Part B directly above, a cherry flavored carbonated beverage was prepared substituting 65.0 mg of aspartame for 12.0 g of grnaulated cane sugar. The product was a yellow-red-colored liquid which visually was less similar to a commerical cherry beverage.

EXAMPLE 11

A. With stirring, 8.0 g of unflavored unsweetened gelatin was dissolved in 475.0 ml of water at approximately 60° C. To the resulting solution, 60.0 g of granulated cane sugar, 1.5 g of citric acid, 0.75 ml of benzaldehyde and 15.0 mg of the red azo compound obtained in Example 1 above were added and the resulting solution was cooled until it jelled to obtain a clear blue-red-colored cherry type gelatin dessert having the same shade as a commercial product.

B. Proceeding in a manner similar to that described in Part A directly above except that 15.0 mg of FD&C Red No. 40 was substituted for the red azo compound of Example 1, there was obtained a yellow-red-colored gelatin dessert which was less similar in color to a commercial cherry type dessert.

C. Following the procedure described in Part A directly above, a cherry type gelatin dessert was prepared except that 330 mg of aspartame was substituted for the granulated cane sugar. The resulting product was a blue-red-colored gelatin type dessert which had a shade similar to the commercial product.

D. In a manner similar to that described in Part B directly above, a cherry gelatin dessert was prepared substituting 330 mg of aspartame for the granulated cane sugar. The product was a yellow-red-colored gelatin type dessert which was less similar in color to a commercial product.

What is claimed is:
1. A method of coloring edible compositions which comprises incorporating into said edible compositions a monoazo compound having the structural formula

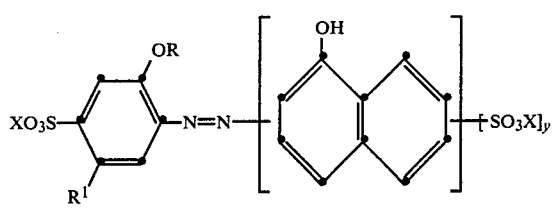

wherein:

R and $R^1$ independently represent non-tertiary $C_1$ to $C_4$ alkyl;

X represents hydrogen or any physiologically acceptable cation; and y represents 1 or 2.

2. A method of coloring edible compositions according to claim 1 which comprises incorporating into said edible compositions a monoazo compound wherein y is 1.

3. A method of coloring edible compositions according to claim 2 which comprises incorporating into said edible compositions a monoazo compond having the structural formula

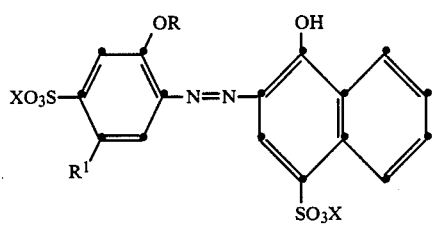

4. A method of coloring edible compositions according to claim 2 which comprises incorporating into said edible compositions a monoazo compound having the structural formula

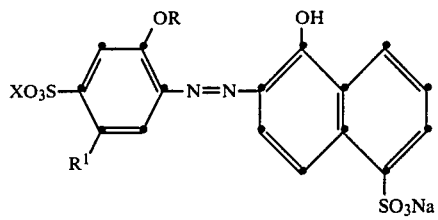

5. A method of coloring edible compositions according to claim 2 which comprises incorporating into said edible compositions a monoazo compound having the structural formula

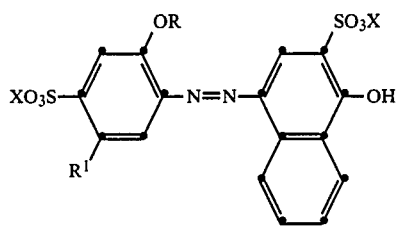

6. A method of coloring edible compositions according to claim 1 which comprises incorporating into said edible compositions a monoazo compound wherein y is 2.

7. A method of coloring edible compositions according to claim 6 which comprises incorporating into said edible compositions a monoazo compound having the structural formula

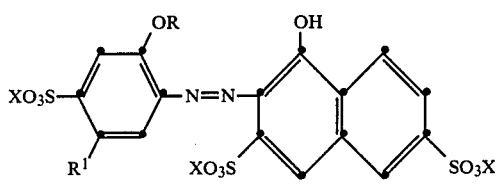

* * * * *